(12) United States Patent
Azizullah et al.

(10) Patent No.: US 12,634,212 B2
(45) Date of Patent: May 19, 2026

(54) SYSTEMS AND METHODS FOR TRANSFERRING DATA ASSOCIATED WITH A USER DEVICE DURING A SPEED TEST

(71) Applicant: Verizon Patent and Licensing Inc., Basking Ridge, NJ (US)

(72) Inventors: Hamid U. Azizullah, Hagerstown, MD (US); William E. Garrett, Framingham, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/583,114

(22) Filed: Feb. 21, 2024

(65) Prior Publication Data

US 2025/0267084 A1     Aug. 21, 2025

(51) Int. Cl.

| | |
|---|---|
| *G06F 15/173* | (2006.01) |
| *H04L 9/40* | (2022.01) |
| *H04L 43/045* | (2022.01) |
| *H04L 43/065* | (2022.01) |
| *H04L 43/0876* | (2022.01) |
| *H04L 69/04* | (2022.01) |

(52) U.S. Cl.
CPC .......... *H04L 43/065* (2013.01); *H04L 43/045* (2013.01); *H04L 43/0876* (2013.01); *H04L 63/04* (2013.01); *H04L 69/04* (2013.01)

(58) Field of Classification Search
CPC . H04L 43/065; H04L 43/045; H04L 43/0876; H04L 63/04; H04L 69/04
See application file for complete search history.

(56) References Cited

U.S. PATENT DOCUMENTS

| | | | | |
|---|---|---|---|---|
| 11,196,841 | B1 * | 12/2021 | Ovadia ................. | H04L 43/065 |
| 11,695,679 | B1 * | 7/2023 | Lagerholm ............. | H04L 43/50 |
| | | | | 709/224 |
| 2012/0016933 | A1 * | 1/2012 | Day .................... | H04L 67/1004 |
| | | | | 709/203 |
| 2018/0206136 | A1 * | 7/2018 | Chow ................... | H04W 24/08 |
| 2019/0230012 | A1 * | 7/2019 | Azizullah ............... | H04L 43/18 |
| 2025/0007803 | A1 * | 1/2025 | Kathare ................. | H04L 47/83 |

* cited by examiner

*Primary Examiner* — John B Walsh

(57) ABSTRACT

A device may schedule performance of an upload speed test, and may receive, from a speed test server, one or more log files generated by a user device during performance of the upload speed test. The device may generate upload results for the upload speed test based on the one or more log files, and may perform one or more actions based on the one or more log files and the upload results.

20 Claims, 9 Drawing Sheets

100 ——▸

Management system
110

180
Perform one or more actions based on the one or more log files, the one or more data files, the upload results, and/or the download results Generate and store one or more records based on the one or more log files, the one or more data files, the upload results, and/or the download results Generate and display an analysis of the one or more log files, the one or more data files, the upload results, and/or the download results Identify an issue based on the one or more log files, the one or more data files, the upload results, and/or the download results Modify network capacity based on the one or more log files, the one or more data files, the upload results, and/or the download results Allocate a service based on the one or more log files, the one or more data files, the upload results, and/or the download results

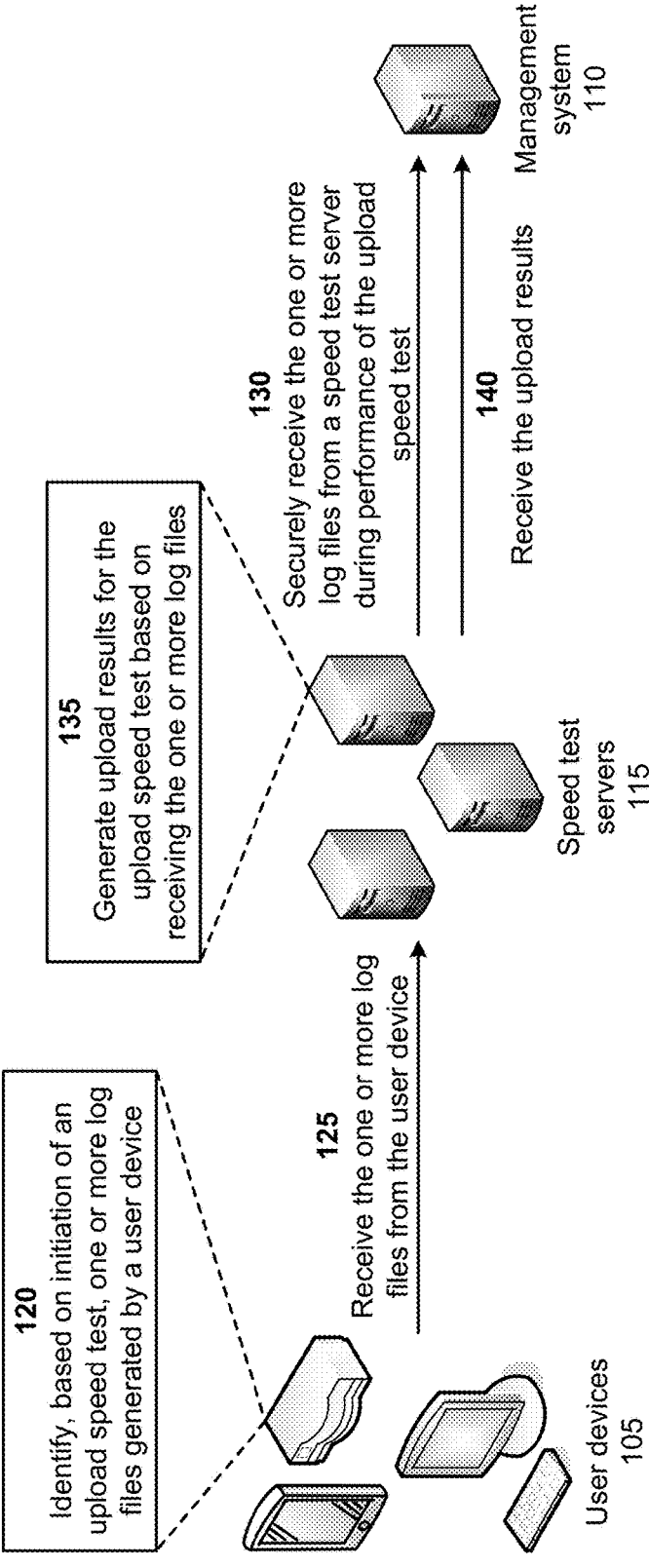

120
Identify, based on initiation of an upload speed test, one or more log files generated by a user device User devices
105

125
Receive the one or more log files from the user device

Speed test servers
115

135
Generate upload results for the upload speed test based on receiving the one or more log files

130
Securely receive the one or more log files from a speed test server during performance of the upload speed test

140
Receive the upload results

Management system
110

100

Generate and store one or more records based on the one or more log files, the one or more data files, the upload results, and/or the download results Generate and display an analysis of the one or more log files, the one or more data files, the upload results, and/or the download results Identify an issue based on the one or more log files, the one or more data files, the upload results, and/or the download results Modify network capacity based on the one or more log files, the one or more data files, the upload results, and/or the download results Allocate a service based on the one or more log files, the one or more data files, the upload results, and/or the download results

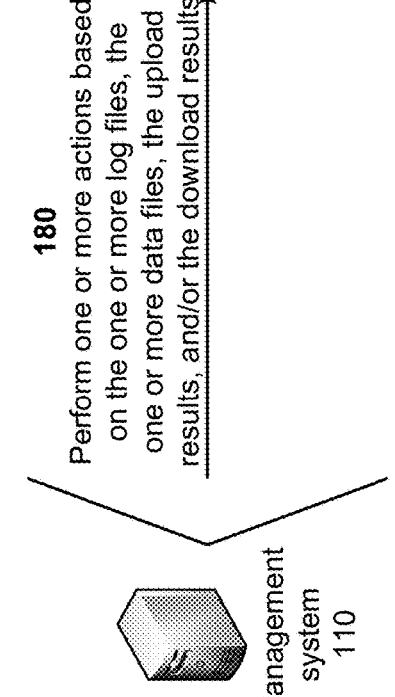

180
Perform one or more actions based on the one or more log files, the one or more data files, the upload results, and/or the download results Management system
110

FIG. 1F

Receive, from a speed test server, one or more log files generated by a user device during performance of an upload speed test Generate upload results for the upload speed test based on the one or more log files Perform one or more actions based on the one or more log files and the upload results

410

420

430

400

SYSTEMS AND METHODS FOR TRANSFERRING DATA ASSOCIATED WITH A USER DEVICE DURING A SPEED TEST

BACKGROUND

A speed test measures latency (e.g., round trip time) from user devices to speed test servers (e.g., or a network), and download and upload throughputs, which signify how fast data can be transmitted to the user device and from the user device, respectively.

BRIEF DESCRIPTION OF THE DRAWINGS

FIGS. 1A-1F are diagrams of an example associated with transferring data associated with a user device during a speed test.

DETAILED DESCRIPTION OF EXAMPLE EMBODIMENTS

Figure 1B:
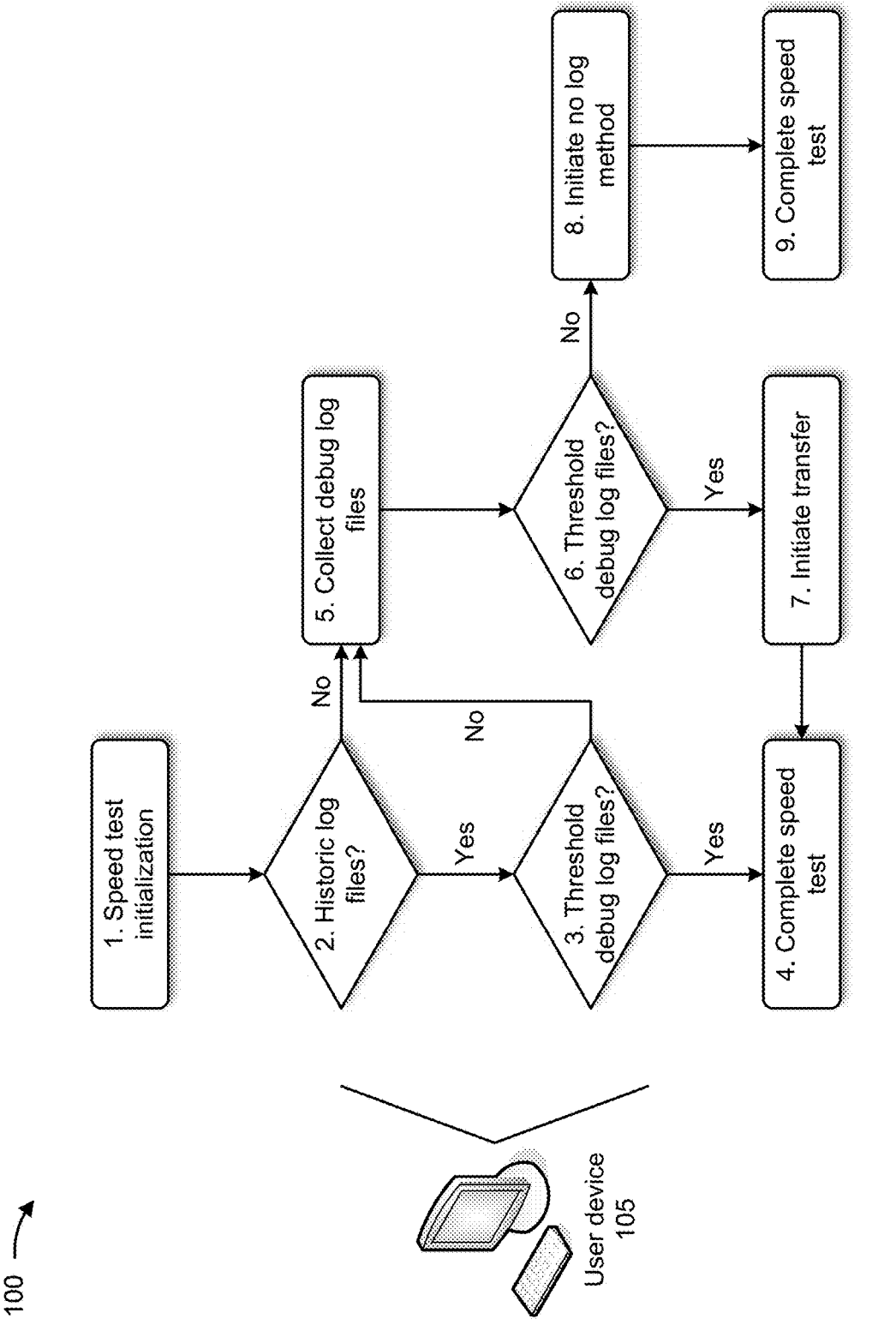

The following detailed description of example implementations refers to the accompanying drawings. The same reference numbers in different drawings may identify the same or similar elements.

Network service providers provide a speed testing service to user devices (e.g., broadband and mobile customers) to adhere to regulations and to provide a means for customers and network support personnel to test network speeds. Although a speed test serves an important function for network service providers and customers, data used during the speed test is never used for any other purpose.

In the context of broadband and mobile telecommunications, user devices, such as modems, routers, extenders, and/or the like play a key role in providing network connectivity to end users. The user devices generate a significant amount of operational data, including logs and device parameters, which are utilized for network diagnostics, troubleshooting, and performance monitoring. However, the current approach for collecting and managing operational data can be resource-intensive, requiring a substantial server infrastructure to handle the data load and placing a heavy burden on network bandwidth which can affect overall network performance. As the volume of operational data generated by user devices continues to grow with the proliferation of connected devices and services, the current approach of log and parameter collection becomes increasingly inadequate. Additionally, the current approach to log management is reactive rather than proactive and often requires intervention only after a customer experiences a problem.

Thus, current techniques for handling user device operational data consume computing resources (e.g., processing resources, memory resources, communication resources, and/or the like), networking resources, and/or other resources associated with requiring a substantial server infrastructure to handle an operational data load, reducing network bandwidth and affecting overall network performance during collection of operational data from user devices, handling customer complaints associated with reduced network bandwidth and diminished network performance, failing to preemptively identify and resolve network bandwidth and network performance issues, and/or the like.

Some implementations described herein provide a management system that transfers data associated with a user device during a speed test. For example, the management system may schedule performance of an upload speed test, and may receive, from a speed test server, one or more log files generated by a user device during performance of the upload speed test. The management system may generate upload results for the upload speed test based on the one or more log files, and may perform one or more actions based on the one or more log files and the upload results, such as identifying an issue, modifying network capacity, allocating a service, and/or the like.

In this way, the management system transfers data associated with a user device during a speed test. For example, the management system may collect operational data (e.g., log files and device parameters) utilized by user devices during an upload speed test with speed test servers. The management system may utilize the operational data to calculate upload throughputs from the user devices to the speed test servers. The speed test servers may utilize the operational data for user device parameters awareness, network utilization, and other services that generate operational data. The management system may also collect configuration data (e.g., kernel updates, configuration updates, firmware updates, and/or the like) utilized by the speed test servers during a download speed test with the user devices. The management system may utilize the configuration data to calculate download throughputs from the speed test servers to the user devices. Thus, the management system may conserve computing resources, networking resources, and/or other resources that would have otherwise been consumed by requiring a substantial server infrastructure to handle an operational data load, reducing network bandwidth and affecting overall network performance during collection of operational data from user devices, handling customer complaints associated with reduced network bandwidth and diminished network performance, failing to preemptively identify and resolve network bandwidth and network performance issues, and/or the like.

FIGS. 1A-1F are diagrams of an example 100 associated with transferring data associated with a user device during a speed test. As shown in FIGS. 1A-1F, example 100 includes user devices 105, a management system 110, and speed test servers 115. Further details of the user device 105, the management system 110, and the speed test servers 115 are provided elsewhere herein.

As shown in FIG. 1A, the user devices 105 (e.g., customer premises equipment (CPE), such as broadband home routers, Wi-Fi extenders, and other network-managed devices) may communicate with the speed test servers 115 in order to initiate upload and download speed tests. The user devices 105 and the speed test servers 115 may communicate with the management system 110 in order to share information.

As further shown in FIG. 1A, and by reference number 120, a user device 105 may identify, based on initiation of an upload speed test, one or more log files (e.g., operational data) generated by the user device 105. For example, a user device 105 and/or a speed test server 115 may initiate an upload speed test to measure latency (e.g., round trip time) from the user device 105 to the speed test server 115, and upload throughput, which signifies how fast data can be transmitted from the user device 105 to the speed test server 115. In some implementations, the user device 105 may initiate the upload speed test based on detection of an event (e.g., a request from the management system 110 or the speed test server 115, expiration of a time period, according to a schedule, a network issue, and/or the like). In some implementations, the user device 105 may select and prioritize the one or more log files based on criteria, such as a debug level, an event type, and/or the like. In some implementations, the user device 105 may include a directory structure (e.g., a data structure) where active log files are written and later archived based on size and age. The user device 105 may monitor the directory structure and may identify log files ready for transfer based on monitoring the directory structure. In some implementations, the user device 105 may utilize log file rotation and archiving to ensure that the most recent and relevant log files are available for transfer during the upload speed test.

The user device 105 may generate a significant amount of operational data, including logs and device parameters, which may be utilized for network diagnostics, trouble-shooting, and performance monitoring. Based on the initiation of the upload speed test, the user device may scan historical (e.g., archived) log directories to identify the one or more log files (e.g., the operational data) generated by the user device 105. If the one or more log files are available, the user device 105 may prepare to transfer the one or more log files during a subsequent upload process. The one or more log files may include diagnostic information, such as kernel configurations, routing details, and operational logs from various hardware and software components of the user device 105. Thus, the user device 105 may utilize the upload speed test to facilitate transfer of the one or more log files, which may reduce a need for additional resources dedicated to logging and device management.

As further shown in FIG. 1A, and by reference number 125, the speed test server 115 may receive the one or more log files from the user device 105. For example, after identifying the one or more log files, the user device 105 may encapsulate the one or more log files before transmit-ting the one or more log files to the speed test server 115. In some implementations, the user device 105 may compress the one or more log files prior to transmission of the one or more log files to the speed test server 115. The speed test server 115 may securely receive the one or more log files and may securely store the one or more log files in a data structure (e.g., a database, a table, a list, and/or the like) associated with the speed test server 115. In some imple-mentations, when receiving the one or more log files from the user device 105, the speed test server 115 may utilize a secure data transfer protocol (e.g., a secure hypertext trans-fer protocol (HTTPS)) to securely receive the one or more log files from the user device 105. Receiving the one or more log files may enable the speed test server 115 to measure upload throughput and to transport valuable troubleshooting data to the management system 110 (e.g., a dual purpose).

As further shown in FIG. 1A, and by reference number 130, the management system 110 may securely receive the one or more log files from the speed test server 115 during performance of the upload speed test. For example, the speed test server 115 may provide, to the management system 110, the one or more log files that are received from the user device 105 during performance of the upload speed test. The management system 110 may securely receive the one or more log files from the speed test server 115. In some implementations, when receiving the one or more log files from the speed test server 115, the management system 110 may utilize a secure data transfer protocol (e.g., HTTPS) to securely receive the one or more log files from the speed test server 115. In some implementations, the management sys-tem 110 may receive other log files (e.g., associated with other user devices 105) from other speed test servers 115, and may store the one or more log files and the other log files in a data structure associated with the management system 110.

As further shown in FIG. 1A, and by reference number 135, the speed test server 115 may generate upload results for the upload speed test based on receiving the one or more log files from the user device 105. For example, the speed test server 115 may measure latency (e.g., round trip time) from the user device 105 to the speed test server 115, and upload throughput indicating how fast data (e.g., the one or more log files) can be transmitted from the user device 105 to the speed test server 115. In some implementations, the latency and the upload throughput may correspond to the upload results generated by the speed test server 115 for the upload speed test and based on receiving the one or more log files. In some implementations, the user device 105 may generate the upload results for the upload speed test based on transmitting the one or more log files to the speed test server 115.

As further shown in FIG. 1A, and by reference number 140, the management system 110 may receive the upload results. For example, the speed test server 115 may provide the upload results for the upload speed test to the manage-ment system 110, and the management system 110 may receive the upload results from the speed test server 115. Alternatively, if the user device 105 generates the upload results, the user device 105 may provide the upload results for the upload speed test to the management system 110, and the management system 110 may receive the upload results from the user device 105.

FIG. 1B depicts initialization of the upload speed test and log file collection by the user device 105. As shown at steps 1 and 2, the user device 105 may initialize the upload speed test, and may determine whether any historic (e.g., archived) log files are available to be transmitted during the upload speed test. If the user device 105 determines that historic log files are available to be transmitted (step 2, yes), the user device 105 may determine whether a threshold level of debug log files are available to be transmitted during the upload speed test (step 3). If the user device 105 determines that the threshold level of debug log files are available to be transmitted during the upload speed test (step 3, yes), the user device 105 may complete the upload speed test (step 4). If the user device 105 determines that historic log files are not available to be transmitted (step 2, no) or that the threshold level of debug log files are not available to be transmitted during the upload speed test (step 3, no), the user device 105 may collect debug log files (step 5). As shown at step 6, the user device 105 may again (e.g., after collection of debug log files) determine whether the threshold level of debug log files are available to be transmitted during the upload speed test. If the user device 105 determines that the threshold level of debug log files are available to be trans-mitted during the upload speed test (step 6, yes), the user device 105 may initiate the transfer of the debug log files (step 7) and may complete the upload speed test (step 4). If the user device 105 determines that the threshold level of debug log files are not available to be transmitted during the upload speed test (step 6, no), the user device 105 may initiate a no log method (step 8, utilizing other data to transfer) and may complete the upload speed test (step 9).

Figure 1C:
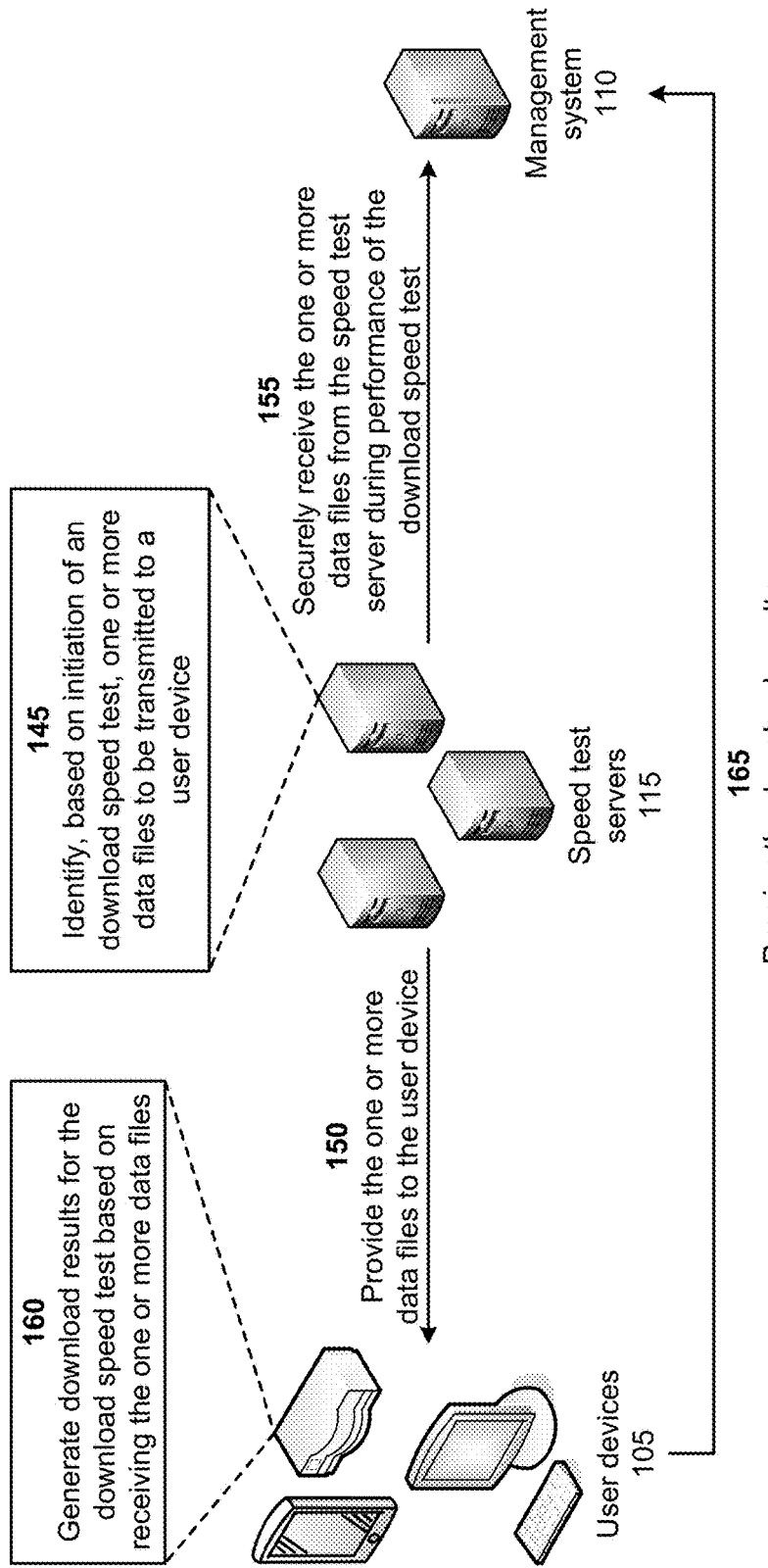

As shown in FIG. 1C, and by reference number 145, the speed test server 115 may identify, based on initiation of a download speed test, one or more data files to be transmitted to the user device 105. For example, the user device 105 and/or the speed test server 115 may initiate a download speed test to measure latency (e.g., round trip time) from the speed test server 115 to the user device 105, and download throughput, which signifies how fast data can be transmitted from the speed test server 115 to the user device 105. In some implementations, the speed test server 115 may initiate the upload speed test based on detection of an event (e.g., a request from the management system 110 or the user device 105, expiration of a time period, according to a schedule, a network issue, and/or the like). In some implementations, the speed test server 115 may select and prioritize the one or more data files based on criteria, such as a required update, an event type, and/or the like. In some implementations, the speed test server 115 may determine whether there are any data files to be transferred to the user device 105, such as kernel updates, configuration updates, firmware updates, containers subscribed to by the user device 105, and/or the like.

As further shown in FIG. 1C, and by reference number 150, the speed test server 115 may provide the one or more data files to the user device 105. For example, after identifying the one or more data files to be transmitted to the user device 105, the speed test server 115 may encapsulate the one or more data files before transmitting the one or more data files to the user device 105. In some implementations, the speed test server 115 may compress the one or more data files prior to transmission of the one or more data files to the user device 105. The user device 105 may securely receive the one or more data files and may securely store the one or more data files in a data structure (e.g., a database, a table, a list, and/or the like) associated with the user device 105. In some implementations, when providing the one or more data files to the user device 105, the speed test server 115 may utilize a secure data transfer protocol (e.g., HTTPS) to securely provide the one or more data files to the user device 105. Providing the one or more log files may enable the user device 105 and/or the speed test server 115 to measure download throughput and to transport valuable configuration data to the management system 110 (e.g., a dual purpose).

As further shown in FIG. 1C, and by reference number 155, the management system 110 may securely receive the one or more data files from the speed test server 115 during performance of the download speed test. For example, the speed test server 115 may provide, to the management system 110, the one or more data files that are provided to the user device 105 during performance of the download speed test. The management system 110 may securely receive the one or more data files from the speed test server 115. In some implementations, when receiving the one or more data files from the speed test server 115, the management system 110 may utilize a secure data transfer protocol (e.g., HTTPS) to securely receive the one or more data files from the speed test server 115. In some implementations, the management system 110 may receive other data files (e.g., associated with other user devices 105) from other speed test servers 115, and may store the one or more data files and the other data files in a data structure associated with the management system 110.

As further shown in FIG. 1C, and by reference number 160, the user device 105 may generate download results for the download speed test based on receiving the one or more data files. For example, the user device 105 may measure latency (e.g., round trip time) from the speed test server 115 to the user device 105, and download throughput indicating how fast data (e.g., the one or more data files) can be transmitted from the speed test server 115 to the user device 105. In some implementations, the latency and the download throughput may correspond to the download results generated by the user device 105 for the download speed test and based on receiving the one or more data files. In some implementations, the speed test server 115 may generate the download results for the download speed test based on transmitting the one or more data files to the user device 105.

As further shown in FIG. 1C, and by reference number 165, the management system 110 may receive the download results. For example, the user device 105 may provide the download results for the download speed test to the management system 110, and the management system 110 may receive the download results from the user device 105. Alternatively, if the speed test server 115 generates the download results, the speed test server 115 may provide the download results for the download speed test to the management system 110, and the management system 110 may receive the download results from the speed test server 115.

Figure 1D:
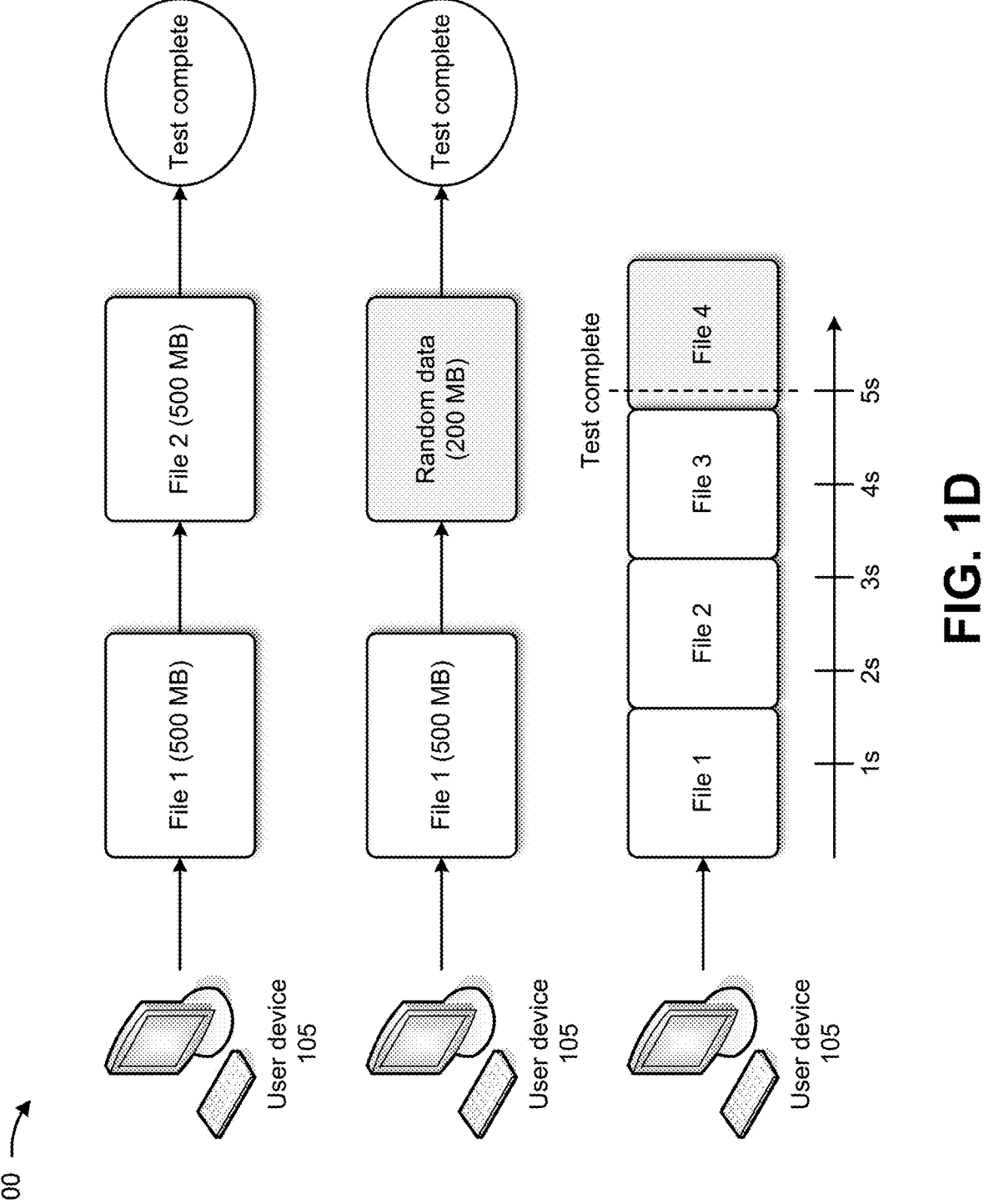

A top portion and a middle portion of FIG. 1D depict file-size-based upload speed tests by the user device 105. The user device 105 may be configured to transmit a fixed amount of data (e.g., log files) during the upload speed test. The user device 105 may determine what log files will fit into the configured size (e.g., the fixed amount of data). For example, if the user device 105 is using log rotation with a fixed size of 500 megabits (MB) per log file, and a file size to use for the HTTPS protocol is configured with a value of two gigabits (GB), the user device 105 may transmit four subsequent log files in a single upload speed test execution. In another example and as shown at the top portion of FIG. 1D, if a file size to use for the HTTPS protocol is configured with a value of one GB, the user device 105 may select two log files (e.g., File 1 with 500 MB and File 2 with 500 MB) to be transferred during the upload speed test. In still another example and as shown at the middle portion of FIG. 1D, if a file size to use for the HTTPS protocol is configured with a value of 700 MB, and the user device only has 500 MB log files, the user device 105 may transmit one log file (e.g., File 1 with 500 MB) and 200 MB of random data.

A bottom portion of FIG. 1D depicts a time-based upload speed test by the user device 105. For example, during an upload speed test, the user device 105 may transmit as much data as possible during a specified period of time (e.g., ten seconds). In the time-based upload speed test, an exact quantity of files to be transmitted may be unknown and may be determined by an actual speed achieved during the upload speed test duration. In some implementations, the user device 105 may include a queue of log files to be transmitted (e.g., log files ordered from oldest to newest) and may attempt to transfer as many of the log files as possible during the upload speed test. After each complete log file transfer, the user device 105 may mark the specific log file as transferred. If the upload speed test finishes before a complete log file is transferred, the user device 105 may utilize the incompletely transferred log file in a subsequent upload speed test and continue further according to the queue of log files. In the example shown at the bottom portion of FIG. 1D, a test duration may be configured as five seconds and the user device 105 may be capable of sending three complete log files (e.g., File 1, File 2, and File 3) over the test duration and may begin the transfer of a fourth log file (e.g., File 4). Since the fourth log file is not fully transferred during the test direction, the user device 105 may mark the fourth log file as to be re-transferred during a subsequent upload speed test execution.

Figure 1E:
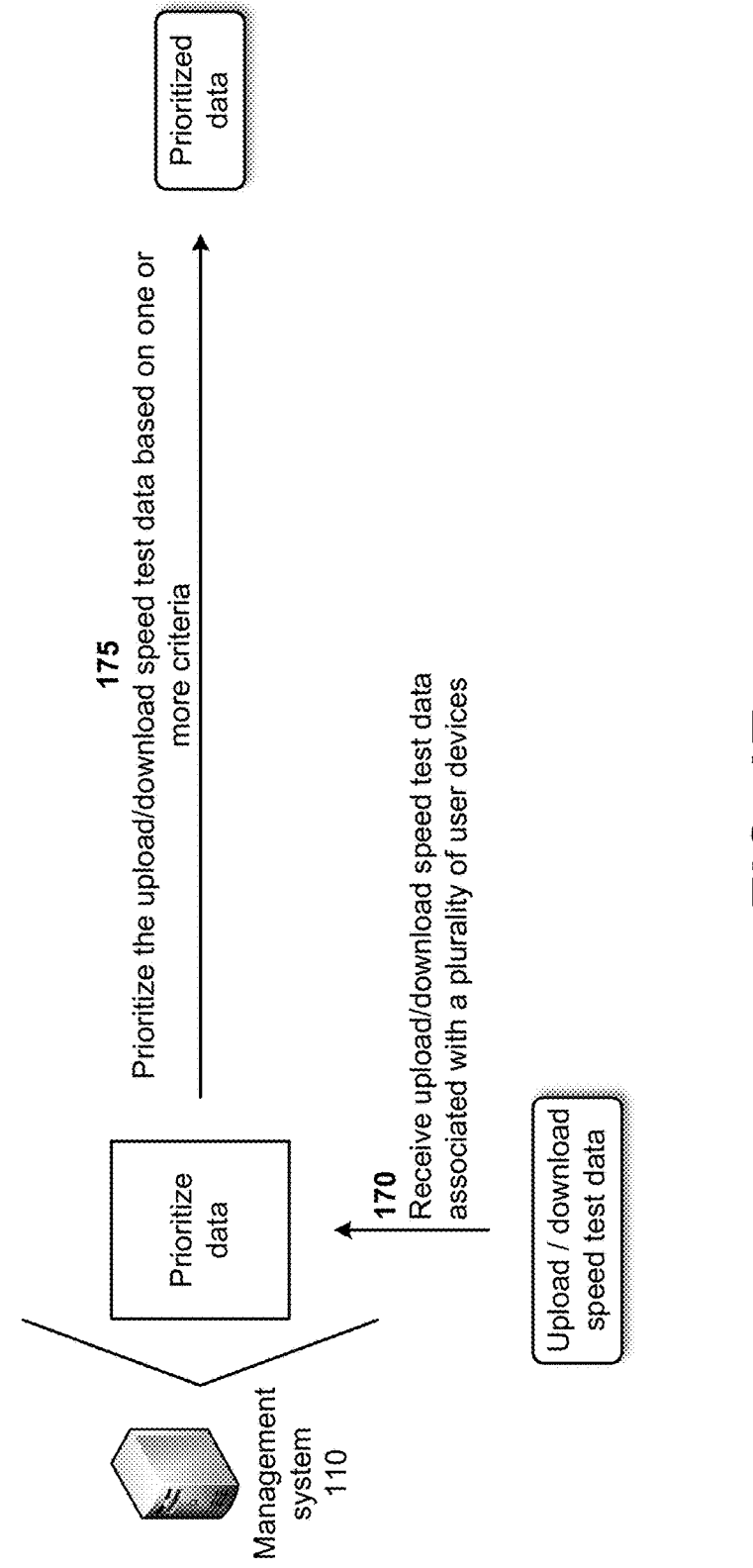

As shown in FIG. 1E, and by reference number 170, the management system 110 may receive upload/download speed test data associated with a plurality of user devices 105 and a plurality of speed test servers 115. For example, the management system 110 may receive log files from a plurality of user devices 105 during upload speed tests, upload results of the upload speed tests, data files from a plurality of speed test servers 115 during download speed tests, and download results of the download speed tests. The log files, the upload results, the data files, and the download results may correspond to the upload/download speed test data associated with the plurality of user devices 105. The management system 110 may receive the upload/download speed test data from the plurality of user devices 105 and the plurality of speed test servers 115.

As further shown in FIG. 1E, and by reference number 175, the management system 110 may prioritize the upload/download speed test data based on one or more criteria. For example, the management system 110 may sort and prioritize the upload/download speed test data to prevent data duplication and overload at the management system 110. The management system 110 may prioritize the upload/download speed test data as a protection mechanism for data structures associated with the management system 110. For example, the management system 110 may sort and prioritize the most critical upload/download speed test data. The priority of processing the upload/download speed test data may be based on one or more criteria, such as a user device record history, pass/fail test criteria, network statistics gathered during the download speed tests and the upload speed tests, and/or the like. In some implementations, the management system 110 may parse the upload/download speed test data, extract key parametric values, and prepare the upload/download speed test data for storage and analysis. This may enable the management system 110 to provide real-time analysis and historical data mining of the upload/download speed test data.

As shown in FIG. 1F, and by reference number 180, the management system 110 may perform one or more actions based on the one or more log files, the one or more data files, the upload results, and/or the download results. In some implementations, performing the one or more actions includes the management system 110 generating and storing one or more records based on the one or more log files, the one or more data files, the upload results, and/or the download results. For example, the management system 110 may analyze the one or more log files, the one or more data files, the upload results, and/or the download results, and may parse parametric values from the one or more log files, the one or more data files, the upload results, and/or the download results. The management system 110 may generate tabular-based or document-based records for database entry or real-time analysis, and may index and store information, such as kernel messages, access logs, firewalls, and filters in a database for future analysis. In this way, the management system 110 conserves computing resources, networking resources, and/or other resources that would have otherwise been consumed by requiring a substantial server infrastructure to handle an operational data load.

In some implementations, performing the one or more actions includes the management system 110 generating and displaying an analysis of the one or more log files, the one or more data files, the upload results, and/or the download results. For example, the management system 110 may analyze the one or more log files, the one or more data files, the upload results, and/or the download results, and may generate analysis results based on analyzing the one or more log files, the one or more data files, the upload results, and/or the download results. The management system 110 may provide the analysis results for display to a user of the management system 110 so that the user may assess network performance for the user devices 105. In this way, the management system 110 conserves computing resources, networking resources, and/or other resources that would have otherwise been consumed by reducing network bandwidth and affecting overall network performance during collection of operational data from user devices 105.

In some implementations, performing the one or more actions includes the management system 110 identifying an issue based on the one or more log files, the one or more data files, the upload results, and/or the download results. For example, the management system 110 may identify a network issue (e.g., a bandwidth issue) that is slowing upload speeds from some user devices 105. The management system 110 may dispatch a technician to service the network issue that is slowing upload speeds from the user devices 105. In this way, the management system 110 conserves computing resources, networking resources, and/or other resources that would have otherwise been consumed by handling customer complaints associated with reduced network bandwidth and diminished network performance.

In some implementations, performing the one or more actions includes the management system 110 modifying network capacity based on the one or more log files, the one or more data files, the upload results, and/or the download results. For example, the management system 110 may determine that network capacity is less for a first set of user devices 105, and more for a second set of user devices 105. The management system 110 may modify the network capacity so that the first set of user devices 105 receives some of the network capacity allotted to the second set of user devices 105. In this way, the management system 110 conserves computing resources, networking resources, and/or other resources that would have otherwise been consumed by failing to preemptively identify and resolve network bandwidth and network performance issues.

In some implementations, performing the one or more actions includes the management system 110 allocating a service based on the one or more log files, the one or more data files, the upload results, and/or the download results. For example, the management system 110 may determine that a service to increase network throughput for some user devices 105 should be implemented based on the one or more log files, the one or more data files, the upload results, and/or the download results. The management system 110 may cause the service to be implemented for the user devices 105 so that network throughput is increased for the user devices 105. In this way, the management system 110 conserves computing resources, networking resources, and/or other resources that would have otherwise been consumed by handling customer complaints associated with reduced network bandwidth and diminished network performance.

In this way, the management system 110 transfers data associated with a user device 105 during a speed test. For example, the management system 110 may collect operational data (e.g., log files and device parameters) utilized by user devices 105 during an upload speed test with speed test servers 115. The management system 110 may utilize the operational data to calculate upload throughputs from the user devices 105 to the speed test servers 115. The speed test servers 115 may utilize the operational data for user device parameters awareness, network utilization, and other services that generate operational data. The management system 110 may also collect configuration data (e.g., kernel updates, configuration updates, firmware updates, and/or the like) utilized by the speed test servers 115 during a download speed test with the user devices 105. The management system 110 may utilize the configuration data to calculate download throughputs from the speed test servers 115 to the user devices 105. Thus, the management system 110 may conserve computing resources, networking resources, and/or other resources that would have otherwise been consumed by requiring a substantial server infrastructure to handle an operational data load, reducing network bandwidth and affecting overall network performance during collection of operational data from user devices 105, handling customer complaints associated with reduced network bandwidth and diminished network performance, failing to preemptively identify and resolve network bandwidth and network performance issues, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
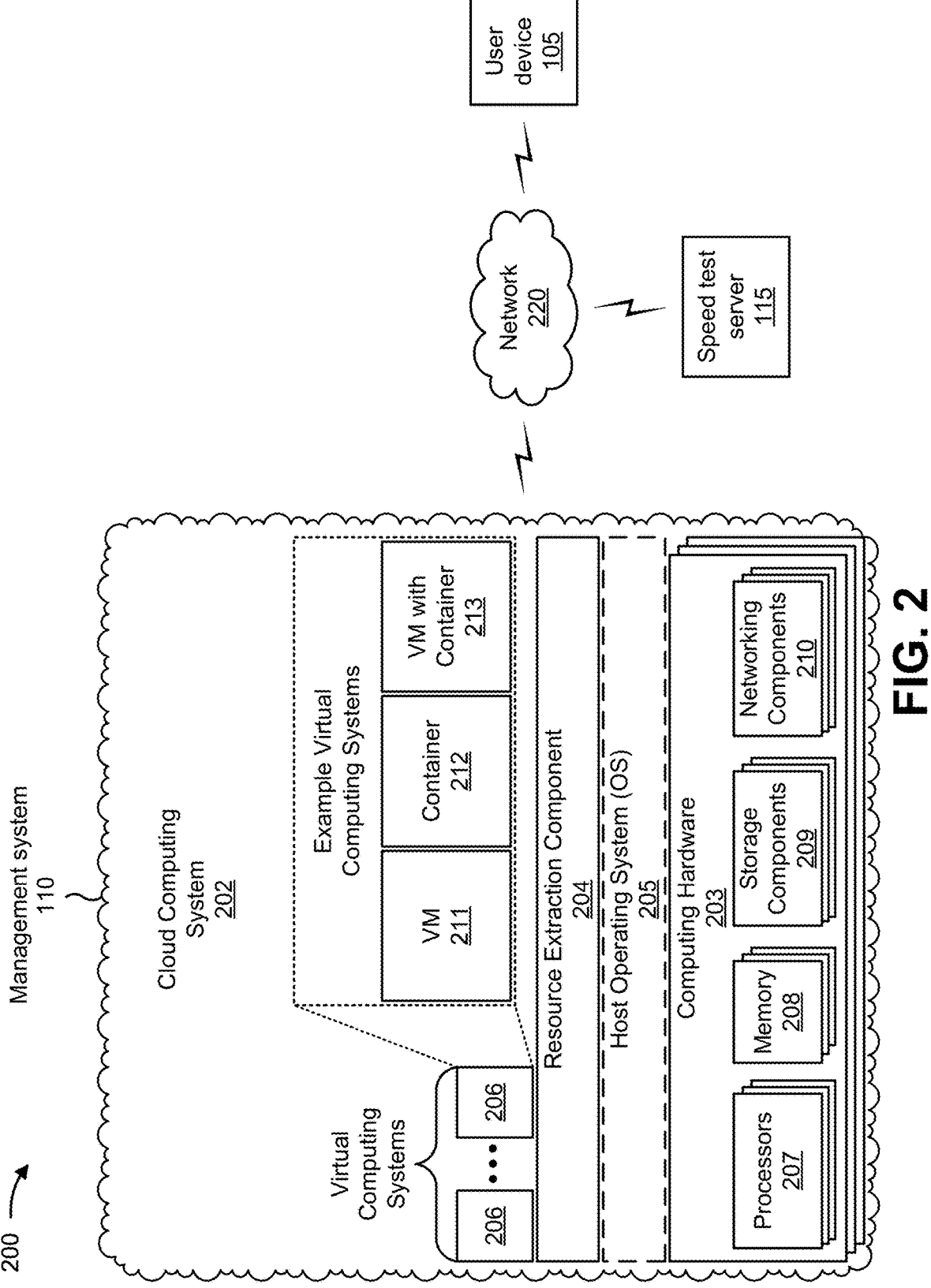
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include the management system 110, which may include one or more elements of and/or may execute within a cloud computing system 202. The cloud computing system 202 may include one or more elements 203-213, as described in more detail below. As further shown in FIG. 2, the environment 200 may include the user device 105, the speed test server 115, and/or a network 220. Devices and/or elements of the environment 200 may interconnect via wired connections and/or wireless connections.

The user device 105 includes one or more devices capable of receiving, generating, storing, processing, and/or providing information, such as information described herein. For example, the user device 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a network device (e.g., customer premises equipment (CPE), a label switching router (LSR), a label edge router (LER), an ingress router, an egress router, a provider router, a virtual router, a gateway, a switch, a firewall, a hub, a bridge, a reverse proxy, a load balancer, and/or the like), or a similar type of device.

The speed test server 115 may include one or more devices capable of receiving, generating, storing, processing, providing, and/or routing information, as described elsewhere herein. The speed test server 115 may include a communication device and/or a computing device. For example, the speed test server 115 may include a server, such as an application server, a client server, a web server, a database server, a host server, a proxy server, a virtual server (e.g., executing on computing hardware), or a server in a cloud computing system. In some implementations, the speed test server 115 may include computing hardware used in a cloud computing environment.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of the computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using the computing hardware 203. As shown, the virtual computing system 206 may include a virtual machine 211, a container 212, or a hybrid environment 213 that includes a virtual machine and a container, among other examples. The virtual computing system 206 may execute one or more applications using a file system that includes binary files, software libraries, and/or other resources required to execute applications on a guest operating system (e.g., within the virtual computing system 206) or the host operating system 205.

Although the management system 110 may include one or more elements 203-213 of the cloud computing system 202, may execute within the cloud computing system 202, and/or may be hosted within the cloud computing system 202, in some implementations, the management system 110 may not be cloud-based (e.g., may be implemented outside of a cloud computing system) or may be partially cloud-based. For example, the management system 110 may include one or more devices that are not part of the cloud computing system 202, such as the device 300 of FIG. 3, which may include a standalone server or another type of computing device. The management system 110 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
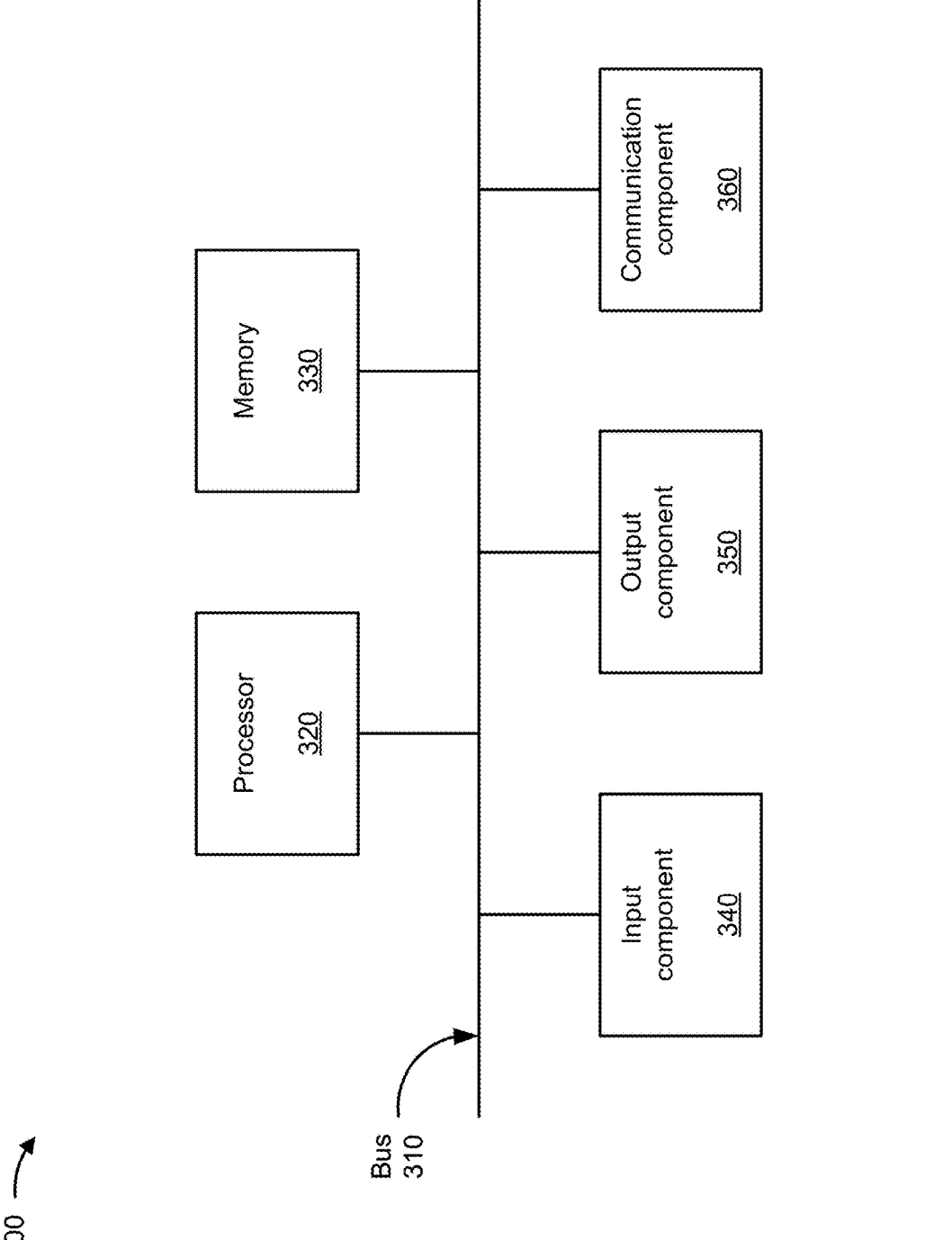
FIG. 3 is a diagram of example components of one or more devices of FIG. 2.

FIG. 3 is a diagram of example components of a device 300, which may correspond to the user device 105, the management system 110, and/or the speed test server 115. In some implementations, the user device 105, the management system 110, and/or the speed test server 115 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hard-wired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
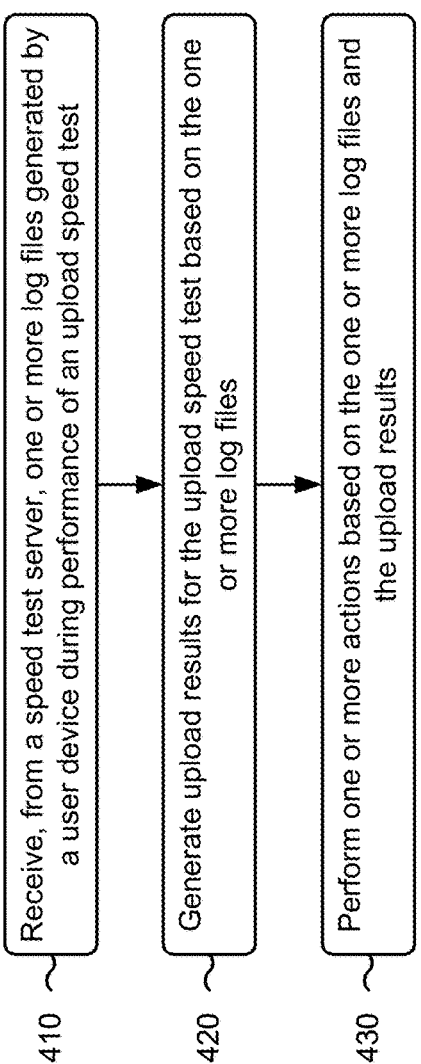
FIG. 4 is a flowchart of an example process for transferring data associated with a user device during a speed test.
Figure 4:

FIG. 4 is a flowchart of an example process 400 for transferring data associated with a user device during a speed test. In some implementations, one or more process blocks of FIG. 4 may be performed by a device (e.g., the management system 110). In some implementations, one or more process blocks of FIG. 4 may be performed by another device or a group of devices separate from or including the device, such as a user device (e.g., the user device 105). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving, from a speed test server, one or more log files generated by a user device during performance of an upload speed test (block 410). For example, the device may receive, from a speed test server, one or more log files generated by a user device during performance of an upload speed test, as described above. In some implementations, receiving, from the speed test server, the one or more log files includes utilizing a secure data transfer protocol to securely receive the one or more log files from the speed test server. In some implementations, the user device is configured to compress the one or more log files prior to transmission of the one or more log files to the speed test server. In some implementations, the user device is configured to initiate the upload speed test based on detection of an event.

As further shown in FIG. 4, process 400 may include generating upload results for the upload speed test based on the one or more log files (block 420). For example, the device may generate upload results for the upload speed test based on the one or more log files, as described above.

As further shown in FIG. 4, process 400 may include performing one or more actions based on the one or more log files and the upload results (block 430). For example, the device may perform one or more actions based on the one or more log files and the upload results, as described above. In some implementations, performing the one or more actions includes generating one or more records based on the one or more log files and the upload results, and storing the one or more records. In some implementations, performing the one or more actions includes generating an analysis of the one or more log files and the upload results, and providing the analysis for display. In some implementations, performing the one or more actions includes or more of identifying an issue based on the one or more log files and the upload results, modifying network capacity based on the one or more log files and the upload results, or allocating a service based on the one or more log files and the upload results.

In some implementations, process 400 includes identifying low network utilization associated with the user device and the speed test server, and scheduling performance of the upload speed test based on identifying the low network utilization.

In some implementations, process 400 includes receiving speed test data associated with a plurality of user devices, and prioritizing the speed test data based on one or more criteria. In some implementations, process 400 includes receiving, from the speed test server, one or more data files transmitted to the user device during performance of a download speed test; generating download results for the download speed test based on the one or more data files; and performing one or more additional actions based on the one or more log files, the one or more data files, the upload results, and the download results.

In some implementations, process 400 includes utilizing a secure data transfer protocol to securely receive the one or more data files from the speed test server. In some implementations, performing the one or more additional actions includes one or more of generating and storing one or more records based on the one or more log files, the one or more data files, the upload results, and the download results, or generating and displaying an analysis of the one or more log files, the one or more data files, the upload results, and the download results. In some implementations, performing the one or more additional actions includes one or more of identifying an issue based on the one or more log files, the one or more data files, the upload results, and the download results; modifying network capacity based on the one or more log files, the one or more data files, the upload results, and the download results; or allocating a service based on the one or more log files, the one or more data files, the upload results, and the download results.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by a device and from a speed test server, one or more log files generated by a user device during performance of an upload speed test and one or more data files transmitted to the user device during performance of a download speed test;

generating, by the device, upload results for the upload speed test based on the one or more log files and download results for the download speed test based on the one or more data files; and performing, by the device, one or more actions based on the one or more log files, the one or more data files, the upload results, and the download results.

2. The method of claim 1, wherein receiving, from the speed test server, the one or more log files comprises:

utilizing a secure data transfer protocol to securely receive the one or more log files from the speed test server.

3. The method of claim 1, wherein the user device is configured to compress the one or more log files prior to transmission of the one or more log files to the speed test server.

4. The method of claim 1, wherein the user device is configured to initiate the upload speed test based on detection of an event.

5. The method of claim 1, further comprising:

identifying low network utilization associated with the user device and the speed test server; and scheduling performance of the upload speed test based on identifying the low network utilization.

6. The method of claim 1, wherein performing the one or more actions comprises:

generating one or more records based on the one or more log files and the upload results; and storing the one or more records.

7. The method of claim 1, wherein performing the one or more actions comprises:

generating an analysis of the one or more log files and the upload results; and providing the analysis of the one or more log files and the upload results for display.

8. The method of claim 1, wherein performing the one or more actions comprises one or more of:

generating and storing one or more records based on the one or more data files and the download results; or generating and displaying an analysis of the one or more data files and the download results.

9. The method of claim 1, wherein performing the one or more actions comprises one or more of:

identifying an issue based on the one or more log files, the one or more data files, the upload results, and the download results;

modifying network capacity based on the one or more log files, the one or more data files, the upload results, and the download results; or allocating a service based on the one or more log files, the one or more data files, the upload results, and the download results.

10. A device, comprising:

one or more processors configured to:

schedule performance of an upload speed test based on identifying low network utilization associated with a user device and a speed test server;

receive, from the speed test server, one or more log files generated by the user device during performance of the upload speed test;

generate upload results for the upload speed test based on the one or more log files;

perform one or more actions based on the one or more log files and the upload results;

receive, from the speed test server, one or more data files transmitted to the user device during performance of a download speed test;

generate download results for the download speed test based on the one or more data files; and perform one or more additional actions based on the one or more log files, the one or more data files, the upload results, and the download results.

11. The device of claim 10, wherein the one or more processors, to perform the one or more actions, are configured to one or more of:

identify an issue based on the one or more log files and the upload results;

modify network capacity based on the one or more log files and the upload results; or allocate a service based on the one or more log files and the upload results.

12. The device of claim 10, wherein the one or more processors are further configured to:

receive speed test data associated with a plurality of user devices; and prioritize the speed test data based on one or more criteria.

13. The device of claim 10, wherein the one or more processors, to receive, from the speed test server, the one or more data files, are configured to:

utilize a secure data transfer protocol to securely receive the one or more data files from the speed test server.

14. The device of claim 10, wherein the one or more processors, to perform the one or more additional actions, are configured to one or more of:

generate and store one or more records based on the one or more log files, the one or more data files, the upload results, and the download results; or generate and display an analysis of the one or more log files, the one or more data files, the upload results, and the download results.

15. The device of claim 10, wherein the one or more processors, to perform the one or more additional actions, are configured to one or more of:

identify an issue based on the one or more log files, the one or more data files, the upload results, and the download results;

modify network capacity based on the one or more log files, the one or more data files, the upload results, and the download results; or allocate a service based on the one or more log files, the one or more data files, the upload results, and the download results.

16. A non-transitory computer-readable medium storing a set of instructions, the set of instructions comprising:

one or more instructions that, when executed by one or more processors of a device, cause the device to:

utilize a secure data transfer protocol to securely receive, from a speed test server, one or more log files generated by a user device during performance of an upload speed test and one or more data files transmitted to the user device during performance of a download speed test;

generate upload results for the upload speed test based on the one or more log files and download results for the download speed test based on the one or more data files; and perform one or more actions based on the one or more log files, the one or more data files, the upload results, and the download results.

17. The non-transitory computer-readable medium of claim 16, wherein the one or more instructions further cause the device to:

schedule performance of the upload speed test based on identifying low network utilization associated with the user device and the speed test server.

18. The non-transitory computer-readable medium of claim 16, wherein the one or more instructions, that cause the device to perform the one or more actions, cause the device to one or more of:

generate and store one or more records based on the one or more log files and the upload results;

generate and display an analysis of the one or more log files and the upload results;

identify an issue based on the one or more log files and the upload results;

modify network capacity based on the one or more log files and the upload results; or allocate a service based on the one or more log files and the upload results.

19. The non-transitory computer-readable medium of claim 16, wherein the one or more instructions further cause the device to:

receive speed test data associated with a plurality of user devices; and prioritize the speed test data based on one or more criteria.

20. The non-transitory computer-readable medium of claim 16, wherein the one or more instructions, that cause the device to perform the one or more actions, cause the device to one or more of:

generate and store one or more records based on the one or more data files and the download results; or generate and display an analysis of the one or more data files and the download results.

* * * * *